(12) United States Patent
Gilbert et al.

(10) Patent No.: US 11,161,063 B2
(45) Date of Patent: Nov. 2, 2021

(54) UNDERDRAIN SYSTEM USING ONE-PIECE CELL DIVIDERS

(71) Applicants: Emily Gilbert, Mountain Home AFB, ID (US); Andy Thruston, Huddleston, VA (US); Gregory Matanoski, New Kent, VA (US)

(72) Inventors: Emily Gilbert, Mountain Home AFB, ID (US); Andy Thruston, Huddleston, VA (US); Gregory Matanoski, New Kent, VA (US)

(73) Assignee: SUEZ GROUPE S.A.S., Paris (FR)

( * ) Notice: Subject to any disclaimer, the term of this patent is extended or adjusted under 35 U.S.C. 154(b) by 343 days.

(21) Appl. No.: 16/014,187

(22) Filed: Jun. 21, 2018

(65) Prior Publication Data

US 2019/0039000 A1 Feb. 7, 2019

Related U.S. Application Data

(60) Provisional application No. 62/523,399, filed on Jun. 22, 2017.

(51) Int. Cl.
*B01D 24/22* (2006.01)
*B01D 24/46* (2006.01)
(Continued)

(52) U.S. Cl.
CPC ........... *B01D 24/22* (2013.01); *B01D 24/005* (2013.01); *B01D 24/4636* (2013.01);
(Continued)

(58) Field of Classification Search
CPC .... B01D 24/12; B01D 24/24; B01D 24/4636; B01D 2201/0415; B01D 24/22;
(Continued)

(56) References Cited

U.S. PATENT DOCUMENTS

| 4,133,766 A | 1/1979 | Adie |
| 4,619,765 A * | 10/1986 | Roberts ................. B01D 24/14 210/289 |

(Continued)

OTHER PUBLICATIONS

International Search Report dated Nov. 6, 2018; 14 pages.

*Primary Examiner* — Matthew O Savage
(74) *Attorney, Agent, or Firm* — Landmark Intellectual Property Law, PLLC; Gregory Murphy

(57) ABSTRACT

The present invention is directed to a one-piece cell divider for use in a filter underdrain system that supports a parous plate that supports a filter media for filtering a fluid. The one-piece cell divider includes: a divider portion; a porous plate support portion, including a flange that supports the porous plate; a support member portion, including a flange that attaches the divider to a base. A filter underdrain using a one-piece cell divider may include; at least one porous plate for supporting the filter media for filtering a fluid, the porous plate spanning across at least one of the dividers; the at least two dividers including: one or more one-piece cell dividers; one or more multiple-piece dividers, each multiple-piece cell divider comprising a divider portion and a support member, the support member being directly under the divider portion.

10 Claims, 12 Drawing Sheets

(51) Int. Cl.
  *C02F 1/00*     (2006.01)
  *B01D 24/00*    (2006.01)
  *E04C 3/22*     (2006.01)

(52) U.S. Cl.
  CPC ............ *C02F 1/004* (2013.01); *E04C 3/22* (2013.01); *B01D 2201/0415* (2013.01); *C02F 2201/004* (2013.01); *C02F 2201/007* (2013.01)

(58) Field of Classification Search
  CPC .. B01D 24/005; C02F 1/004; C02F 2201/007; C02F 2201/004; E04C 3/00
  USPC ........................................ 210/264, 291, 293
  See application file for complete search history.

(56) References Cited

U.S. PATENT DOCUMENTS

| | | | |
|---|---|---|---|
| 5,089,130 A * | 2/1992 | Nichols | B01D 24/005 210/232 |
| 5,618,421 A | 4/1997 | Sorosinski | |
| 7,160,452 B2 * | 1/2007 | Saito | B01D 24/12 210/270 |
| 2004/0055944 A1 | 3/2004 | Dyson et al. | |

\* cited by examiner

FIGURE 1(A) – PRIOR ART
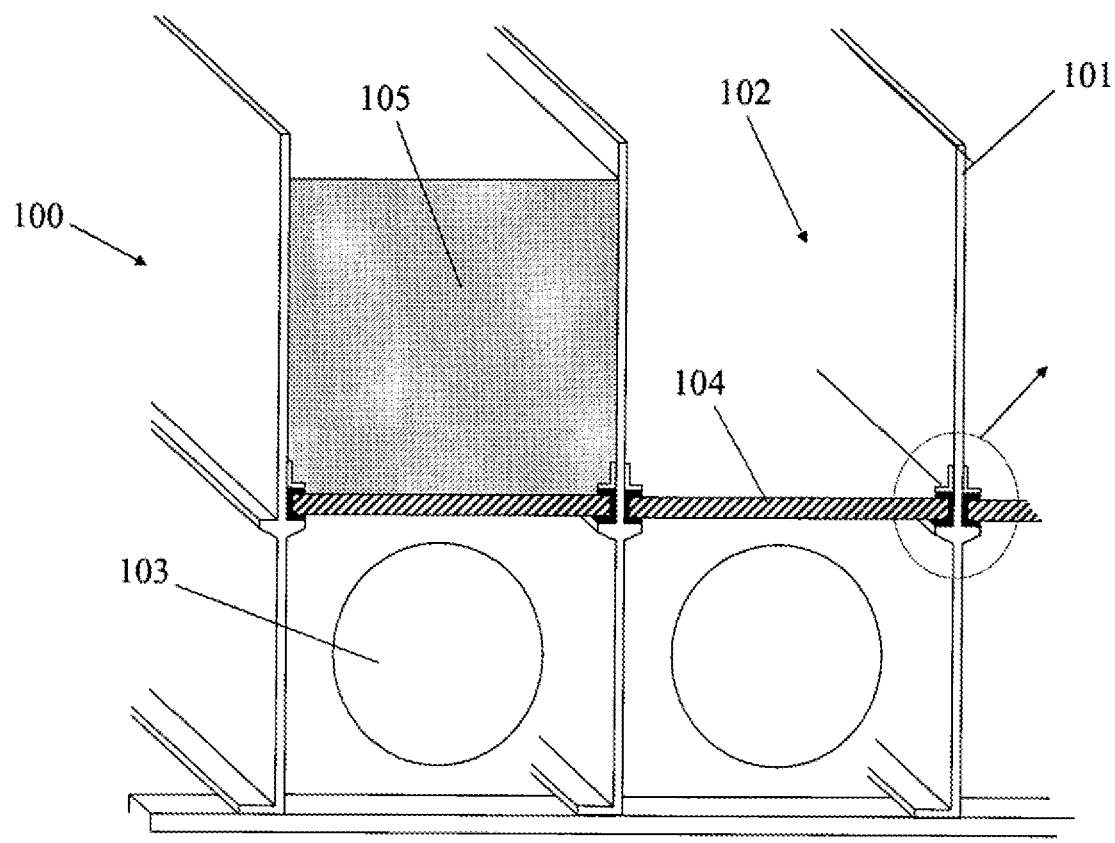
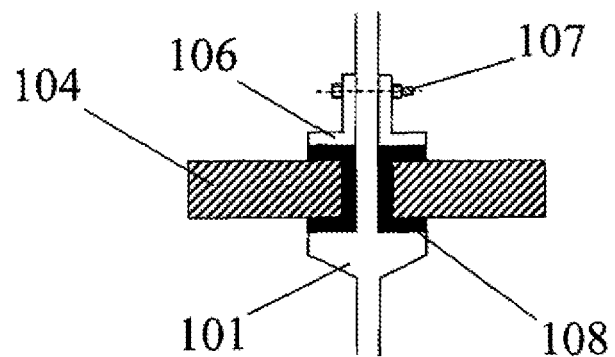
FIGURE 1(B) – PRIOR ART

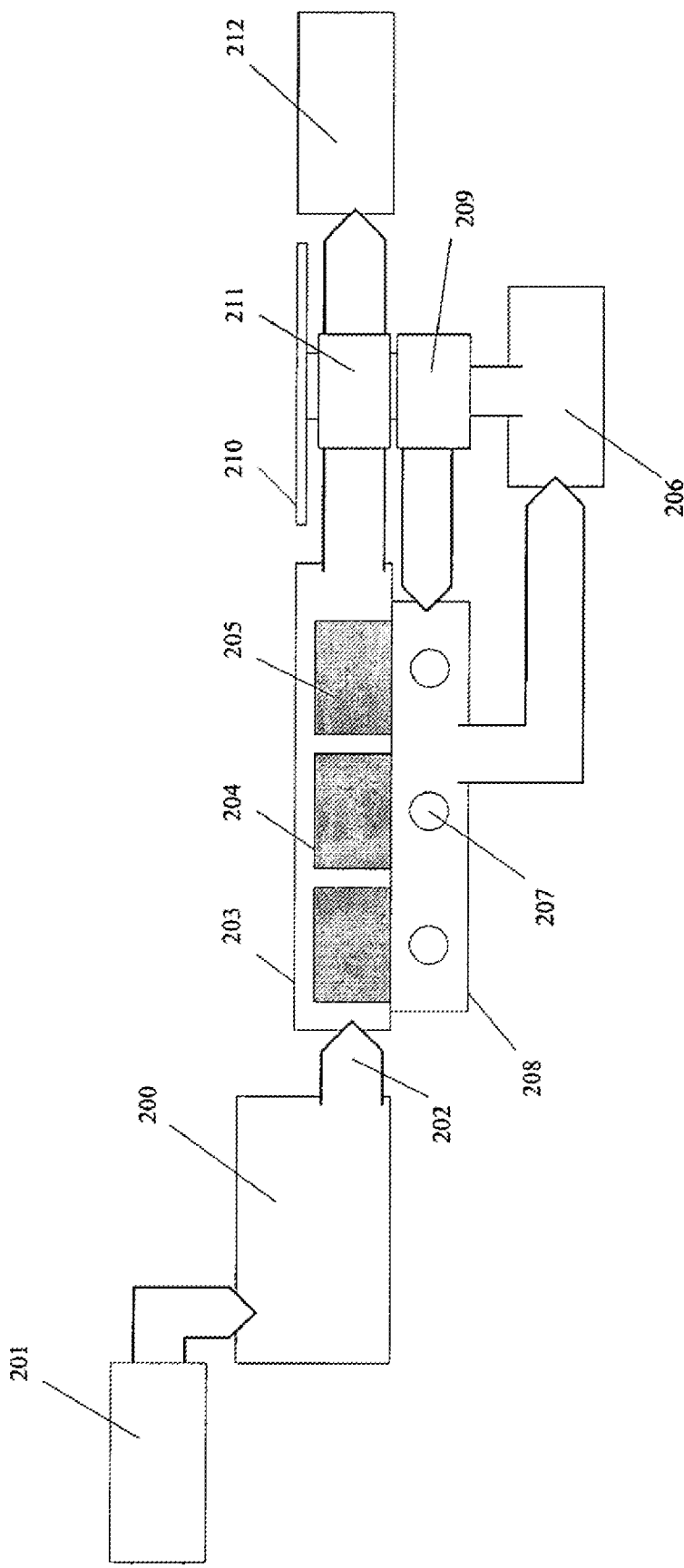
FIG. 2 - PRIOR ART

Figure 7

UPDATED ABW FRP UNDERDRAIN SYSTEM
UPDATED QUICKPLATE W/ 12 INCH CELL SPACING

| 710A | 710B | 710C | 710D |

UNDERDRAIN SYSTEM USING ONE-PIECE CELL DIVIDERS

RELATED APPLICATIONS

The present application claims priority to U.S. Provisional Patent Application No. 62/523,399, filed 22 Jun. 2017, entitled "Underdrain Systems Using One-Piece Cell Dividers," which is incorporated herein by reference in its entirety.

BACKGROUND

Automatic backwash traveling bridge sand filters are commonly used for the treatment of municipal and industrial water supplies as well as wastewater effluents. Owners attest to the outstanding performance and economics of the automatic backwash filter. In large part, the automatic backwash filter has stayed in the forefront of treatment technology.

The conventional automatic backwash filler underdrain design has been in use since the late 1940's. The original design was constructed oat of steel, which was changed to fiberglass in the mid 1970's. However, there are certain difficulties associated with traditional designs. For example, field installation of the system may be labor intensive, caulking must be installed under clean and dry conditions, the caulking must be applied very consistently to provide an adequate seal the sand media develops leaks in the caulk area, and the sand media leaks are difficult and expensive to repair.

Accordingly, a system is needed that is substantially leak proof and significantly reduces material and labor installation costs.

SUMMARY OF THE INVENTION

Some aspects in accordance with some embodiments of the present invention may include a one-piece cell divider for use in a filter underdrain for supporting a porous plate in to supporting a filter media for filtering a fluid, the one-piece cell divider comprising: a divider portion, wherein at least two divider portions form a cell; a porous plate support portion, comprising a flange that supports the porous plate; a support member portion, comprising a flange that is anchored to the one-piece cell, divider to a base-plate.

Some aspects in accordance with some embodiments of the present invention may include a one-piece cell divider wherein the flange that supports the porous plate is substantially perpendicular to the divider portion.

Some aspects in accordance with some embodiments of the present invention may include a divider portion comprises one or more holes or attachment devices to receive a tie-rod or other device to maintain the one-piece cell divider in a set position.

Some aspects in accordance with some embodiments of the present invention may include a one-piece cell divider for use in a filter underdrawn for supporting a porous plate in tarn supporting a filter media for filtering a fluid, the one-piece cell divider comprising: a divider portion, wherein at least two divider portions form a cell; a porous plate support portion, comprising a flange that supports the porous plate; a support member portion, comprising a flange that is anchored to the one-piece cell divider to a base-plate, and one or more angles attached to the divider portion used to hold the porous plate in contact with the porous plate support portion.

Some aspects in accordance with some embodiments of the present invention may include a porous plate held in contact with the porous plate support portion by a fastener inserted through the porous plate and into the porous plate support portion.

Some aspects in accordance with some embodiments of the present invention may include a filter underdrain for supporting a filter media between at least two dividers forming at least one cell, the filter underdrain comprising: at least one porous plate for supporting the filter media for filtering a fluid, the porous plate spanning across at least one of the dividers; the at least two dividers comprising: one or more one-piece cell dividers; one or more multiple-piece dividers, each multiple-piece cell divider comprising a divider portion and a support member, the support member being directly under the divider portion.

Some aspects in accordance with some embodiments of the present invention may include a filter underdrain for supporting a filter media between at least two dividers forming at least one cell the filter underdrain comprising: at least one porous plate for supporting the filter media for filtering a fluid, the porous plate spanning across at least one of the dividers; the at least two dividers comprising: one or more one-piece cell dividers; one or more multiple-piece dividers, each multiple-piece cell, divider comprising a divider portion and a support member, the support member being directly under the divider portion, wherein the at least one porous plate spans from one one-piece cell divider to a second one-piece cell divider, and/or wherein the porous plates have butt-joints where the porous plates join into the one-piece cell divider.

Some aspects in accordance with some embodiments of the present invention may include a filler underdrain for supporting a filter media bet ween at least two dividers forming at least one cell, the filter underdrain comprising: at least one porous plate comprised of polyethylene for supporting the filter media for filtering a fluid, the porous plate spanning across at least one of the dividers; the at least two dividers comprising: one or more one-piece cell dividers; one or mere multiple-piece dividers, each multiple-piece cell divider comprising a divider portion and a support member, the support member being directly under the divider portion.

Some aspects in accordance with some embodiments of the present invention may include a multiple-piece divider that may comprise a saddle portion, the saddle portion being disposed on top of the porous plate and receives the dividing portion into a saddle in the saddle portion.

These and other aspects will become apparent from the following description of the invention taken in conjunction with the following drawings, although variations and modifications may be effected without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail it is to be understood that the Invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 1(a)-(b) illustrate an exemplary conventional automatic backwash filter design.

FIG. 2 depicts an exemplary general diagram illustrating components of a water filtration system incorporating an automatic backwash filter, in accordance with some embodiments of the present invention.

FIG. 7 illustrates an exemplary arrangement of porous plate, in accordance with some embodiments of the present invention.

Figure 3:
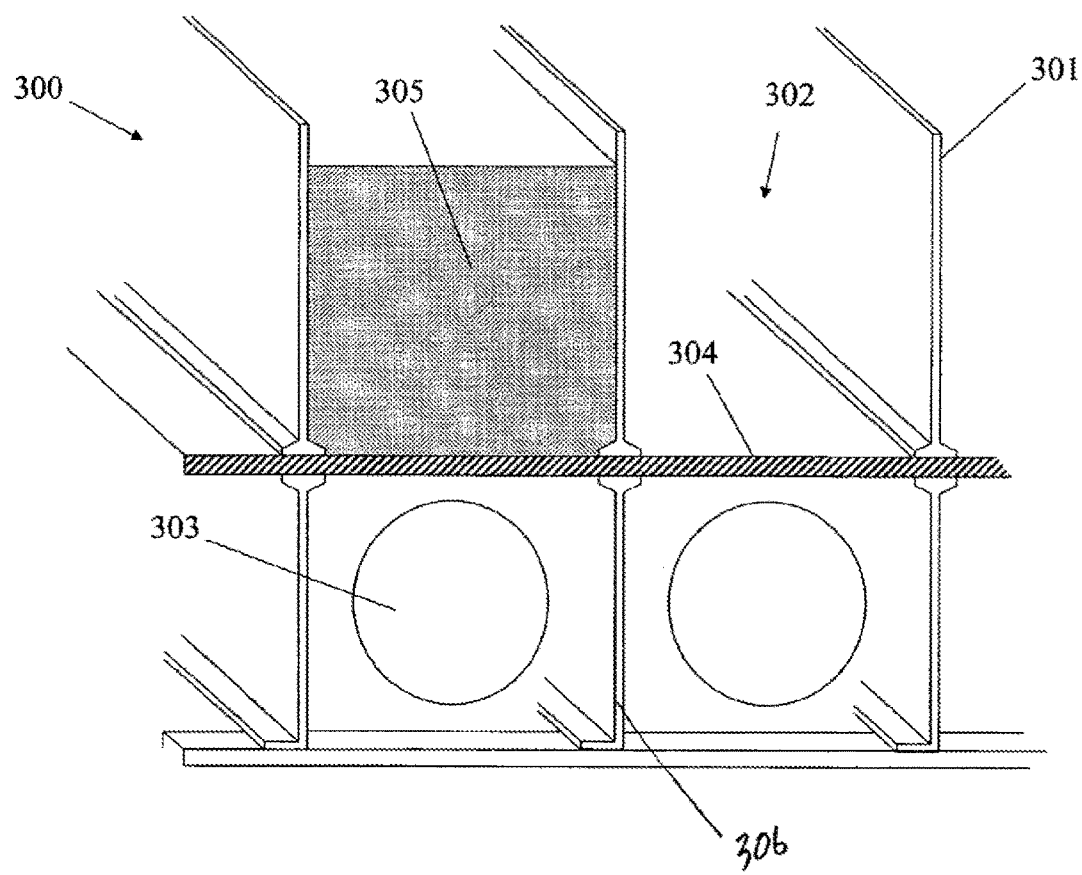
FIG. 3 illustrates some aspects of an automatic backwash filtration system, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplar embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural and alternately, any term in the plural may be interpreted to be in the singular.

An illustration of an exemplary conventional automatic backwash filter design is shown in FIGS. 1(a)-(b). A filter underdrain 100 may comprise a series of lateral partitions 101, which may divide the niter bed into a multitude of compliments 102. Each compartment may be arranged for connection to a separate effluent or backwash port 103. Within each partition 101, above the ports, there may be a porous plate 104.

Porous plate 104 may act as a supporting deck or ledge for filter sand media 105 in each separate compartment 102. Porous plates 104 may be typically formed from a heavy plastic, such as polyethylene, or ceramic such as aluminum oxide, and may be designed to support the weight of the filters and media. For example, media depth may be approximately 11 inches. In some typical configuration, five porous plates, each measuring approximately 30 inches long by approximately 12 inches wide may be installed in each of a sixteen-foot wide compartment, or cell.

It is desirable for the joints between each of these porous plates to be sealed or substantially sealed to prevent or deter the sand media from leaking into the effluent port area. The porous plate may be typically sealed in each cell, for example, utilizing caulking. As shown in FIG. (b), each porous plate 104 may be mounted to the partition and secured in place by angle 106 and mounting bolt hardware 107. The space between porous plate 104 and partition 101 may be filled with caulking 108.

FIG. 2 is an exemplary general diagram illustrating the components of a water filtration system incorporating an automatic backwash filter. During filtration, water may flow into filter tank 200 from influent channel 201, through influent ports 202, and onto filter bed 203, which may comprise a plurality of filter cells 204. Flow may be downward through filter media 205 contained in each filter cell 204 in filter bed 203 and into effluent channel through each effluent port 207 in each underdrain 208 of each filter cell 204. The filter media may typically be sand or a similar granular material, as is well known to those of skill in art.

Note that the system may be designed with and without air and/or water distribution. For example, systems may include a traveling bridge filtration system, which may incorporate an air wash or clean effluent sequence and equipment to prevent or deter media loss from an individual cell during air wash or effluent cleaning. In other examples, systems may be incorporated into a low-profile underdrain filtration system. In a filtration system incorporating a low-profile underdrain an automatic backwash system may not be typically employed and individual filtration cells may not be used. Instead, the fluid to be cleaned fills a filtration bed, filtering down through the filter media and exiting through the underdrain. Backwashing is accomplished by taking the filtration system out of service and passing water (such, as but not limited to clean effluent) and/or air is up through the filtration bed. Particulates and other materials released from the filter.

The backwash process may usually be initiated either by a predetermined head loss increase or by a preset time interval. Once initiated, the automatic backwash mechanism 209, typically suspended from a motor-driven carriage 210, may draw water from the effluent channel and discharge it into the underdrain 208 of the filter cell 204 being backwashed. The backwash water may expand and fluidize media bed 205 in the filter cell 204 to release at least some collected solids.

A washwater hood and pump 211, also suspended, from the carriage 210, may capture the released solids and discharge them into a washwater trough 212 to be carried away.

In some circumstances, backwash mechanism 209 may move along the entire length of the filter, backwashing each compartment in turn until all have been cleaned aid the loss of bead has returned to normal. At least some of filter cells 204, except those in the compartment being backwashed, may remain in operation. Sufficient clean water is preferably maintained in effluent channel 206 to perform a backwash, generally eliminating the requirement for separate backwash water storage. Once carriage 210 reaches the end of filter tank 200, it typically sits with the pumps off until another backwash cycle is automatically initiated.

Backwashing is not normally carried to completion. Regularly repeated short cleaning cycles are preferably employed to keep the media in a nearly clean condition, and limit solids penetration to the upper 2 to 3 inches of the media. The presence of some material within the bed aids in the removal of particulate material during filtration.

FIG. 3 illustrates some aspects of an automatic backwash filtration system. Automatic filter 300 may include a series of lateral partitions 301, which divide the filter into a plurality of compartments 302. Each compartment may be arranged for connection to a separate effluent or backwash port 303. Each partition 301 may be supported on porous plate 304. Filter sand media 305 may be filled in each compartment. Filter sand media 305 is typically, but not necessarily, filled to a depth of approximately eleven inches.

Porous plate 304 may be formed so as to be large enough to provide a media support for a plurality of cells, spanning a plurality of underdrain support members 306. In one embodiment, porous plate 304 may be approximately four feet by four feet six inches and provides support for either six eight. Inch cells or font twelve inch cells or other single or multiple combinations of cells.

As shown in FIG. 3, partition 301 may be mounted atop a continuous section of porous plate 304, using mounting bolt hardware. In this situation, there may not be any need for caulking. Porous plate 304 may first be mounted to lower support 306 of the effluent port. Then, partition 301 may be mounted flush atop porous plate 304.

The automatic backwash filter typically operates at hydraulic loading rates of 2 to 3 gallons per minute per square foot. Backwash may be initiated at a head loss increase of 2 to 6 inches over clean bed conditions. Backwash typically occurs once every 2 to 6 hours, and each cell is backwashed for approximately 30 seconds. The total operating head loss through the filter is typically 6 to 10 inches of water. The media in each compartment is preferably an 11-inch bed of sand, which is supported by the aforementioned plastic or ceramic porous plate. For some applications, alternative media designs such as dual sand and anthracite coal media up to 16 to 24 inches in depth at activated carbon up to 48" in depth are employed.

Figure 4:
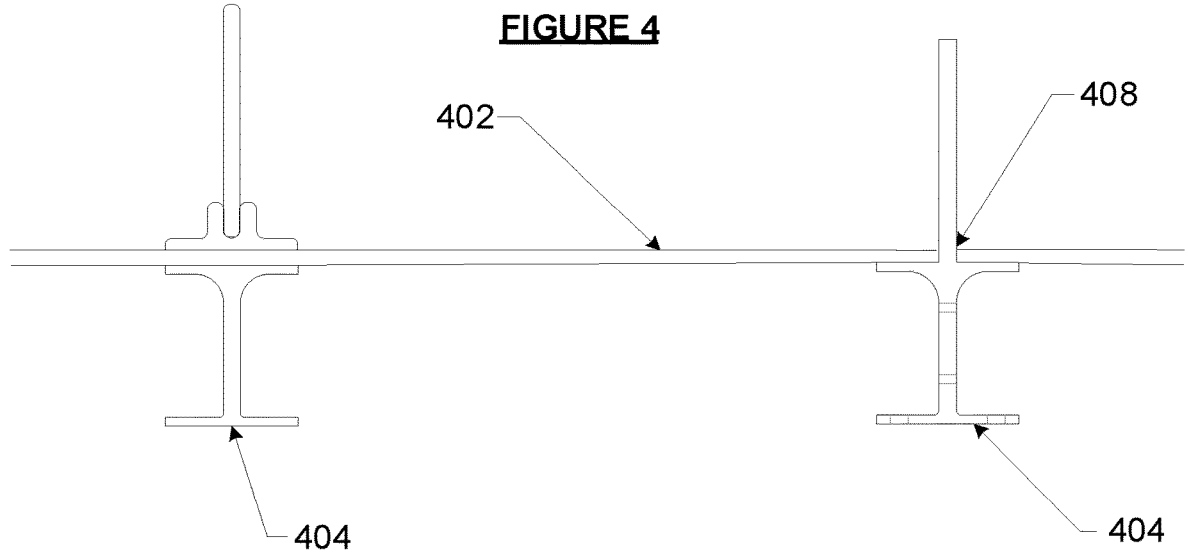
FIG. 4 illustrates at least some advantages of a generic low-profile underdrain, in accordance with some embodiments of the present invention.

As shown in FIG. 4 and similar to FIG. 3 for the automatic backwash underdrain, each porous plate 402 may be supported by support members 404 at evenly spaced intervals. Porous plates 402 may be joined together at lap-joint 408 to help prevent the leakage of the filter media into the underdrain.

Figure 5:
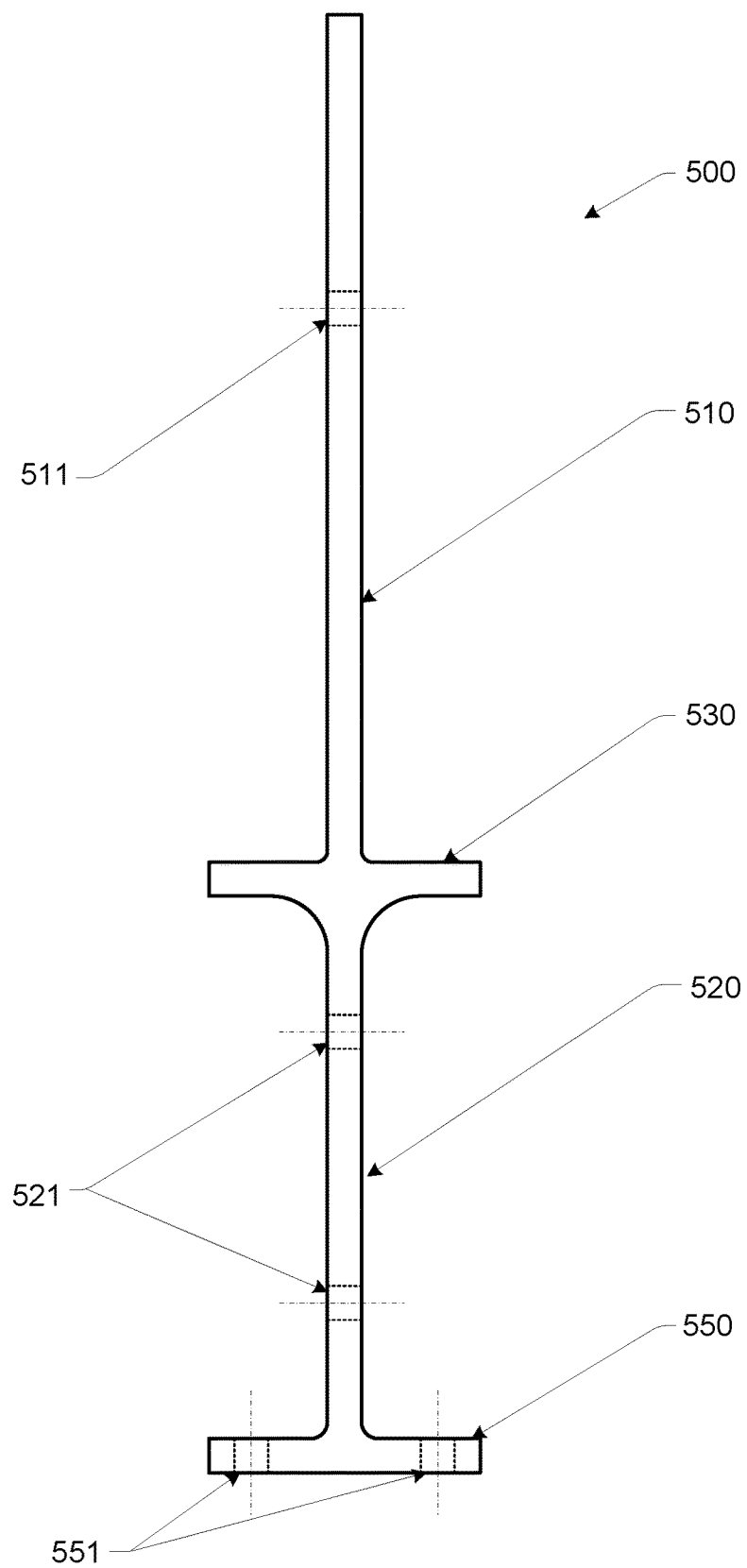
FIG. 5 illustrates a one-piece cell divider, in accordance with some embodiments of the present invention.

FIG. 5 illustrates a one-piece cell divider 500, in accordance with some embodiments of the present invention. The one-piece cell divider 500 may be a single unit that replaces a lower support member and cell partition (or cell divider) from earlier systems. The one-piece cell divider 500 may therefore comprise an upper divider portion 510 that acts as a cell divider (or partition), and a lower support member portion 520 that includes a porous plate support portion in the form of a flange that supports the porous plate. Porous plate may sit on surface 530 defined by the flange, and may be affixed thereto. In accordance with some embodiments, upper divider portion 510 may comprise one or more holes 511 configured to receive tie-rods or other devices to for additional support. The lower support member portion 520 may further comprise one or more holes 521, and may also comprise a bottom surfaced defined pair of flanges 550 respectively extending substantially perpendicularly from both sides of a lower end of the support member portion, which in turn may comprise one or more holes 551 for attachment of the bottom surface of a base-plate. Such one-piece cell divider 500 may be used in addition to the more traditional multiple piece lower support members and cell partitions. Note that the one-piece cell divider 500 may also comprise an integral anchoring device formed into the cell divider, rather than requiring a separate bolt-on angle.

Figure 6:
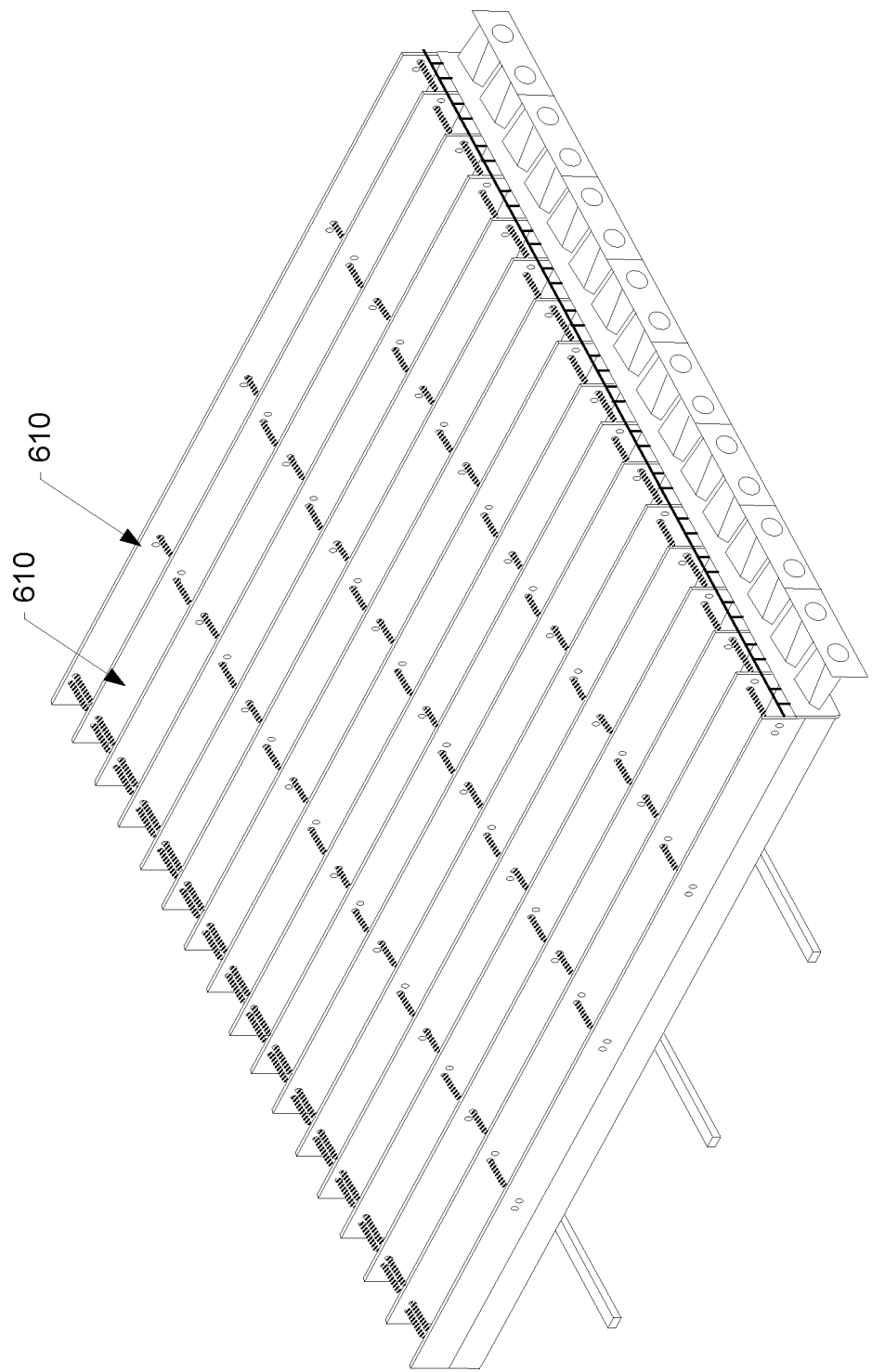
FIG. 6 illustrates a system using one-piece cell dividers, in accordance with some embodiments of the present invention.

FIG. 6 illustrates that the one-piece cell dividers may be used, for example, every divider. With reference to FIG. 7, the porous plates may be installed between the one-piece cell dividers. The solid one-piece cell, divider may prevent or reduce leakage of filtration media, (for example, sand) between dividers. Moreover, should a portion of the underdrain system need, to be repaired or replaced, this may be accomplished without the need to disassemble most of the system. Moreover, such an arrangement may:

allow for an underdrain to be more quickly or efficiently installed or repaired
  eliminate slots and lap joints (and issues associated therewith)
  eliminate the use of starter plates
  use self-tapping screws rather than propel nuts for quicker installation
  allow media leak detections within only four (4) foot wide sections
  allow the continued use for 8 or 1.2 inch cell spacing currently in use.

Moreover, use of a one-piece cell divider may result in simpler maintenance. For example, dating installation, a solid partition may be installed once every 4 feet. The porous plates may be sized to fit between these solid partitions. Lower partitions may still be present once every 8" or 12" (depending on the design). This may also result in simpler installation and potentially less labor. The underdrain may now be installed using self-drilling/self-tapping screws. Previous designs often required a threaded stud that had to be located prior to installation of the porous plates and was secured using nuts and washers on the threaded stud. Easier maintenance is also to be expected.

Perhaps even more advantageously, analysis indicates that the use of a one-piece cell divider may even reduce initial capital costs, while installation costs to the customer may be very similar or less than conventional filters where every cell has its own porous plate (which requires additional labor for the caulking of seams).

Figure 8:
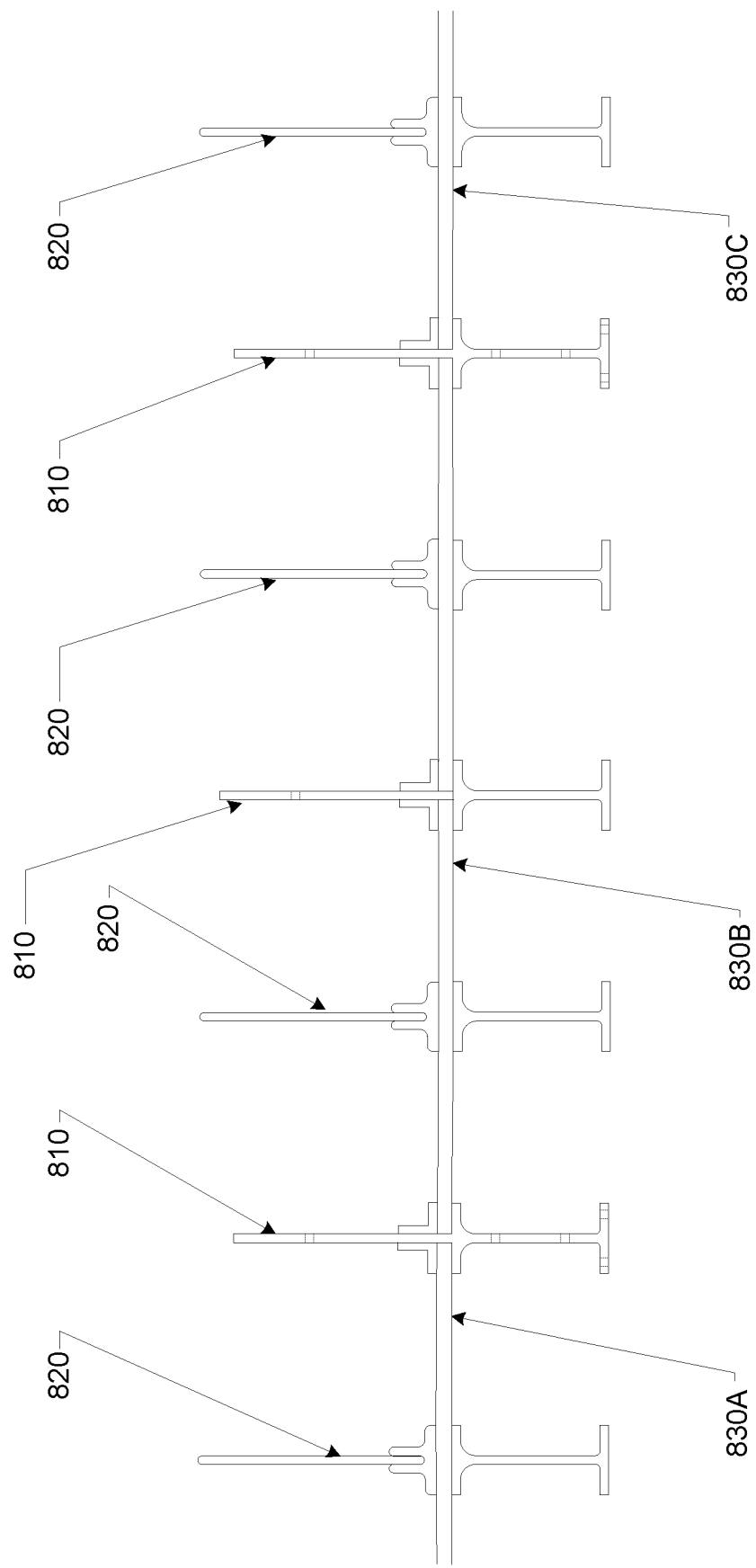
FIG. 8 illustrates an exemplary assembly of the cell partitions, in accordance with some embodiments of the present invention.

FIG. 8 illustrates an exemplary assembly of the cell partitions. For example, as shown in FIG. 8, the one-piece cell divider may be used every other divider. As noted, the remaining parts between the four-foot span may comprise a two or three-part support design comprising a lower beam, saddle, and cell sheet. One-piece cell dividers 810 may be used, along with more traditional multiple piece support and dividers 820. It can be seen from FIG. 8 that porous plates 830A, 830B, 830C may be positioned between the one-piece cell dividers 810, and may be supported by the traditional multiple piece support and dividers 820. It Such an arrangement prevents media leakage between areas bordered by the one-piece cell dividers 810.

Figure 9:
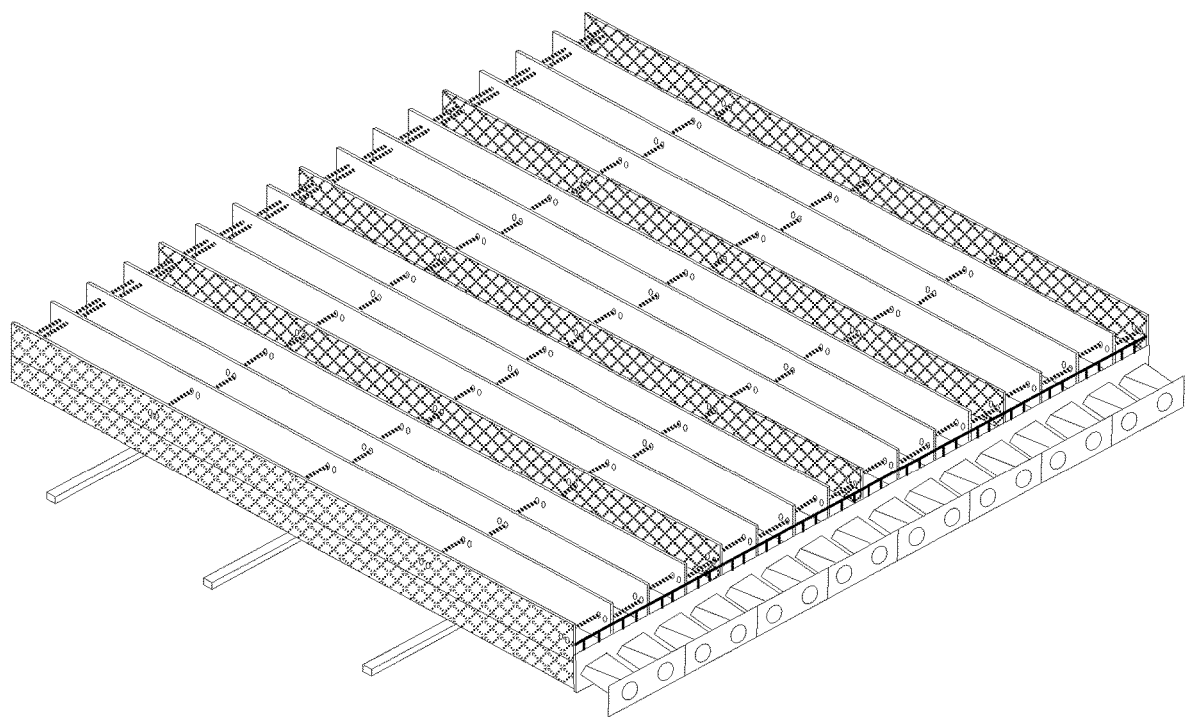
FIG. 9 illustrates a system using one-piece cell dividers, in accordance with some embodiments of the present invention.

FIG. 9 illustrates an exemplary system where every fourth divider is a one-piece cell divider. As noted, the remaining pans between the four-foot span may comprise a two or three-part support design comprising a lower beam, saddle, and cell sheet.

Figure 10:
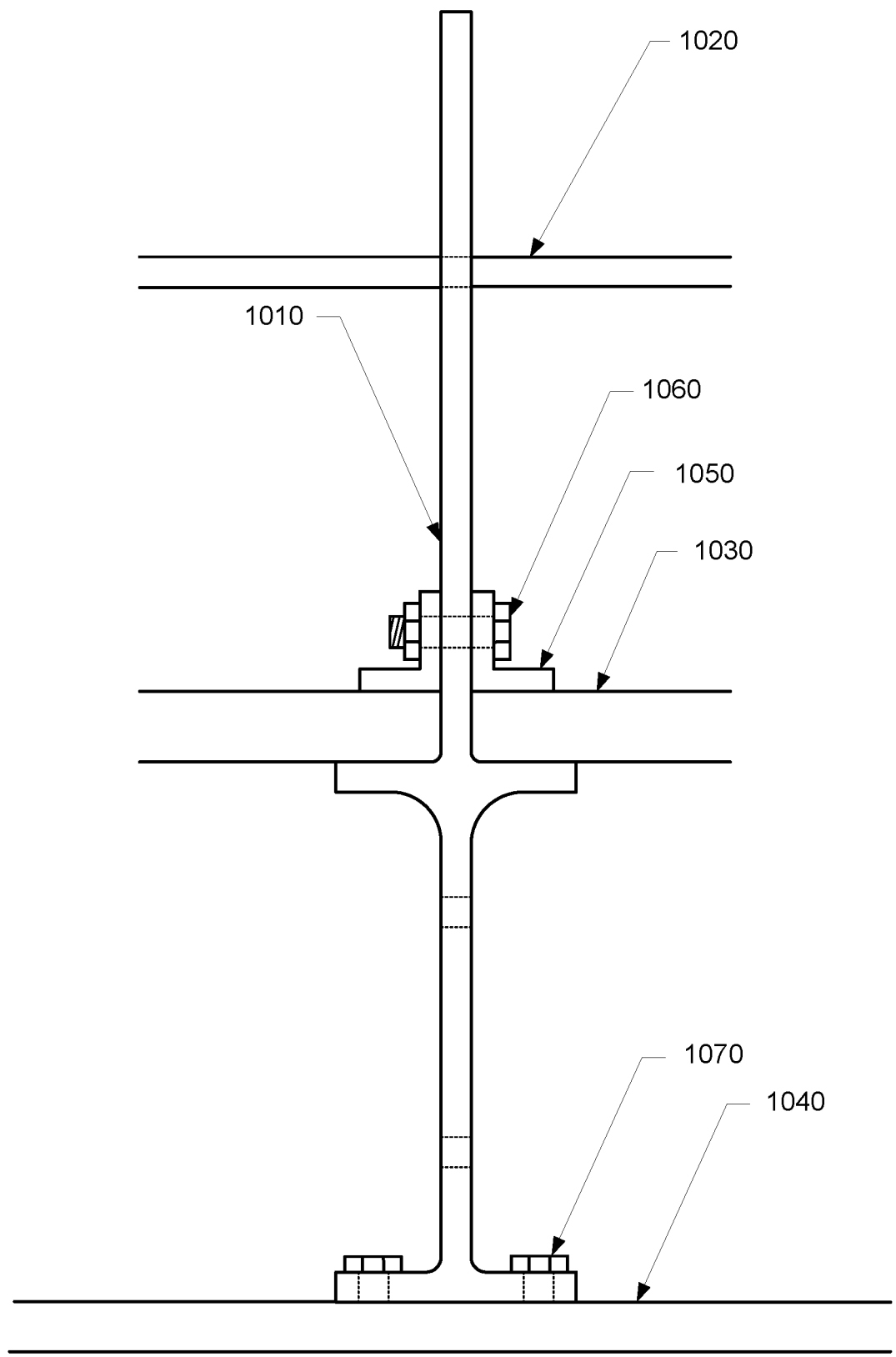
FIG. 10 illustrates a system using one-piece cell dividers, in accordance with some embodiments of the present invention.

FIG. 10 illustrates how, in accordance with some embodiments of the present invention, a one-piece cell divider may be used. One-piece divider 1010 may be bolted or attached to baseplate 1040 via a bolt, screw, or other fastener 1070, and held in place by tie-rod 1020. Porous plate 1030 may be held into place by using an angle 1050, attached by a screw, bolt, or other fastener 1060.

Figure 11:
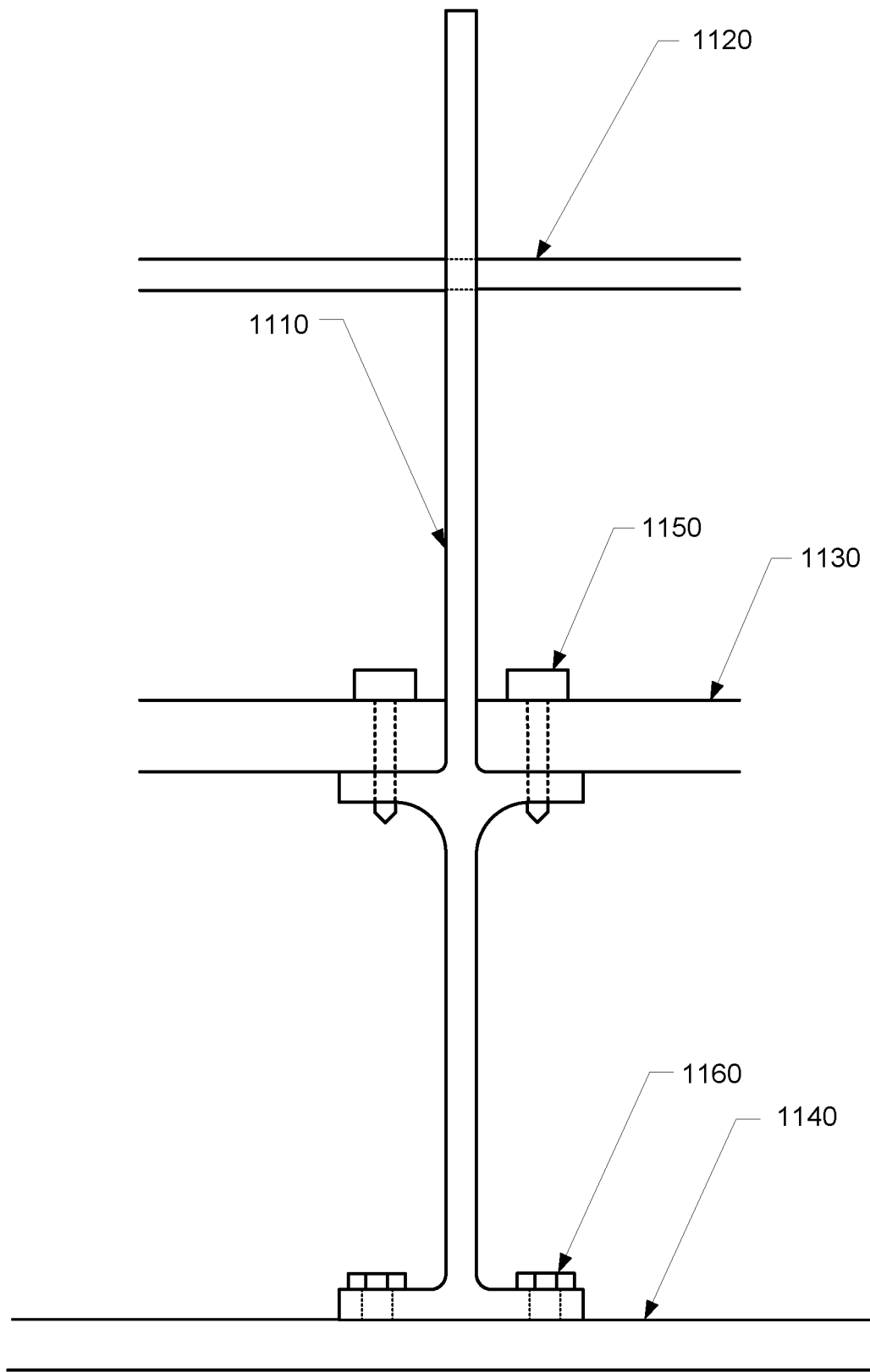
FIG. 11 illustrates a system using one-piece cell dividers, in accordance with some embodiments of the present invention.

In accordance with some other embodiments, and as shown in FIG. 11, the angle in FIG. 10 may be omitted. In FIG. 11 one-piece divider 1110 may again be attached to a baseplate 1140 or other surface via fastener 1160. Tie-rod 1120 may again maintain the one-piece divider 1110 in a vertical or substantially vertical position. However, rather than use angle, a fastener (such as but not limited to a self-tapping screw) 1150 may be used to attach porous plate 1130 to the divider 1110. The use of self-tapping screws (or other listeners) is possible since in accordance with some embodiments of the present invention the porous plate may be comprised of a plastic (such as but not limited to polyethylene) or ceramic (such as but not limited to aluminum oxide). Other plate materials may not permit the use of self-tapping screws or similar fasteners.

Figure 12:
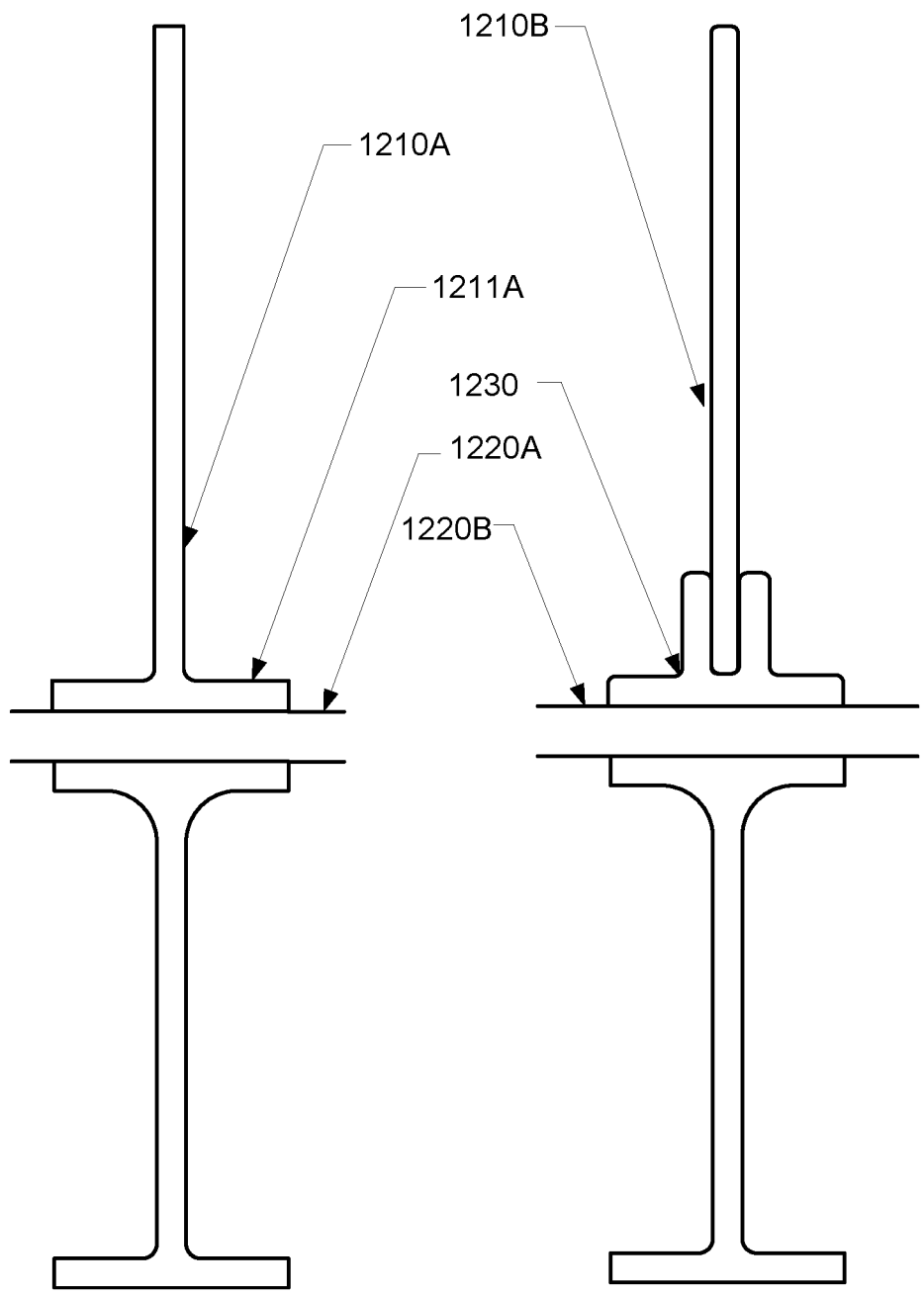
FIG. 12 illustrates a variation using two-piece cell dividers, in accordance with some embodiments of the present invention.

As noted above, when the one-piece cell divider is not utilized, a two or three-piece cell divider may be used. FIG. 12 illustrates a two-piece divider 1210A and a three-piece divider 1210B. Both sit atop the porous plate 1220A, 1220B. The two-piece cell divider has a flange 1211 built in that allows the divider to sit atop the porous plate 1220A, while the three-piece cell divider may utilize a saddle 1230 that receives a divider 1210B. There may be different variations of components, but the scope of the invention is directed to each variation.

Figure 13:
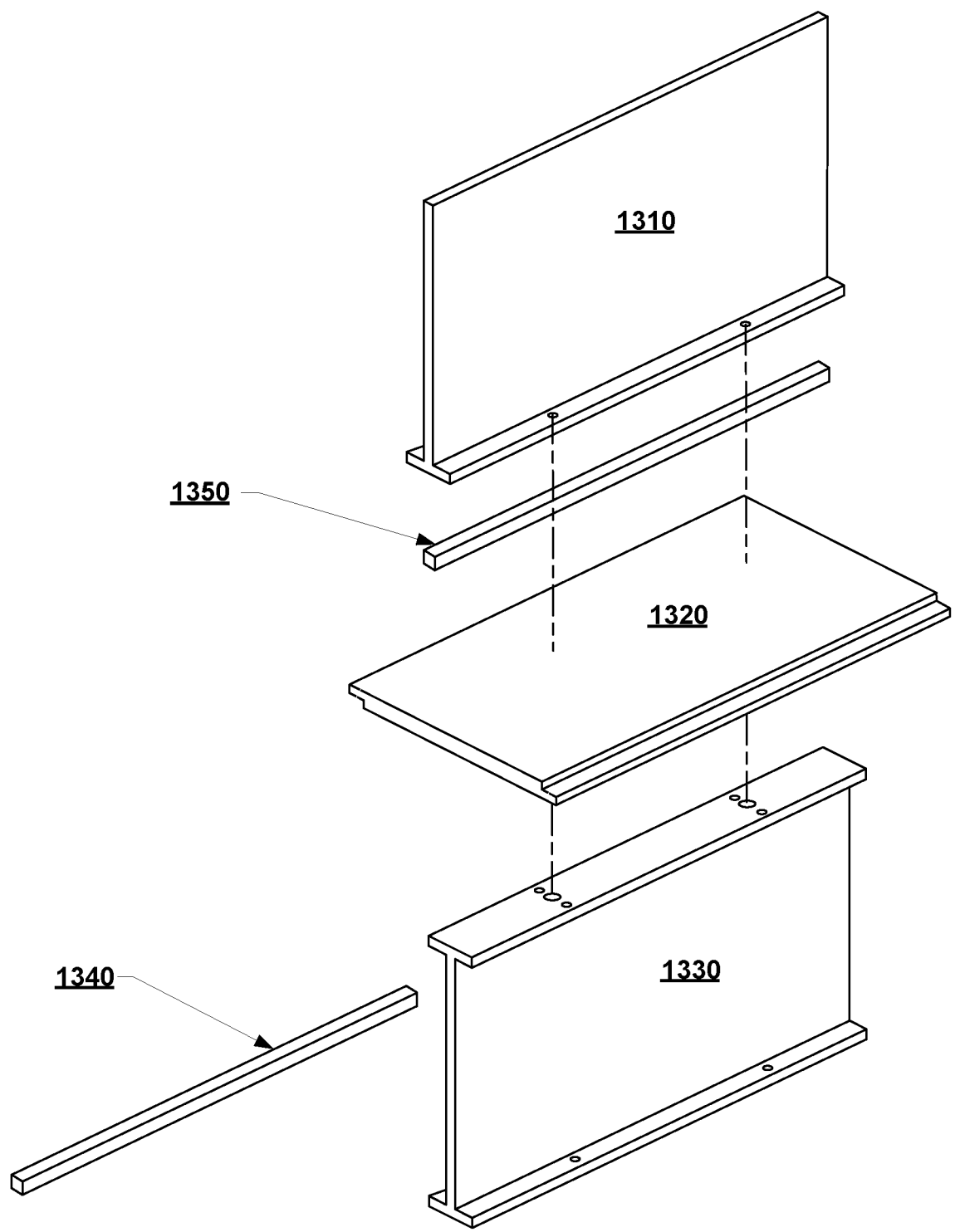
FIG. 13 illustrates au exemplary arrangement of multiple piece support and dividers, in accordance with some embodiments of the present invention.

FIG. 13 illustrates an exemplary arrangement of multiple piece support and dividers and may be used between the one-piece cell dividers. With reference to FIG. 13, flanges on cell partitions 1310 may be mounted to porous plate 1320 and lower support member 1330 by bolts or any other means of affixation in porous plate 1320. Stainless steel bars 1340 and 1350 or caulk beads may also be used. Mounting cell partitions 1310 to lower support member 1330 through porous plate 1320 may be beneficial in that the porous plate may span more than one cell and removes the need for caulking of the mount between the porous plate and the cell dividers, as in conventional systems. An alternative to using flanges on cell partition 1310 to mount it directly to porous plate 1320 within a channel of a channel member, which in turn may then be mounted on the porous plate.

Those of ordinary skill in the art will appreciate that them is no limitation on plate size or spacing of the underdrain supports, plates, end pieces, etc. of the invention. Depending on material thickness, any length and width of these components may be made to span large distances. Moreover, the underdrain supports may be formed into single pieces to span a specific distance. The various components used in constructing the invention may utilize any number of materials, such as FRP, all plastics, steel, etc. For example, the porous plate may be made from plastics (such as but not limited to polyethylene), wood, steel, aluminum oxide, etc. The porous plate may also be replaced with some type of screen or mesh material.

The invention has several advantages in installation, such as reduced installation labor. A low-profile bottom cell divider simplifies grouting procedure. The elimination of the need for caulking saves significant installation time per cell. The use of a bolt-in top cell divider provides total access to porous plates during installation. The invention also has reduced risks. The illustrated embodiments provide for the elimination of paths for media leaks via a two-piece cell divider. The end wall pocket for the porous plate also has safety advantages. The elimination of porous plate "ledge joints" reduces risks. The invention has enhanced underdrain strength. For example, the porous plate is continuously supported. The I-beam design for lower cell divider improves strength, as does the bolt-in porous plate. It has a convertible media depth by virtue of a bolt-in top cell divider. It has reduced maintenance by reduced potential for media leaks. It has direct replacement capability for existing old-style design underdrains.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A one-piece cell divider for use in a filter underdrain for supporting a porous plate in turn supporting a filter media for filtering a fluid, the filter underdrain having a base-plate, the one-piece cell divider comprising:
   an upper divider portion, wherein at least two of the upper divider portions form a cell when installed in the filter underdrain;
   a porous plate support portion comprising a flange for supporting the porous plate;
   a lower support member portion comprising a pair of flanges for attachment to the base-plate, wherein the pair of flanges respectfully extend substantially perpendicularly from both sides of a lower end of the lower support member portion.

2. The one-piece cell divider of claim 1, wherein the flange that supports the porous plate is substantially perpendicular to the divider portion.

3. The one-piece cell divider of claim 1, wherein the divider portion comprises one or more holes configured to receive a device to maintain the one-piece cell divider in a set position.

4. The one-piece cell divider of claim 1, further comprising one or more angles attached to the divider portion used to hold the porous plate in contact with the porous plate support portion.

5. The one-piece cell divider of claim 1, further comprising a fastener, wherein the porous plate is held in contact with the porous plate support portion by the fastener inserted through the porous plate and into the porous plate support portion.

6. A filter underdrain system utilizing one or more one-piece cell dividers of claim 1, the filter underdrain system comprising:
   at least two dividers comprising:
      one or more one-piece cell dividers of claim 1; and
      one or more multiple-piece dividers, each multiple-piece cell divider comprising a divider portion and a support member, the support member being directly under the divider portion; and at least one porous plate for supporting filter media between the at least two dividers for filtering a fluid, the porous plate spanning to at least one of the one-piece cell dividers of claim 1.

7. The filter underdrain system of claim 6, wherein the at least one porous plate spans from one one-piece cell divider to a second one-piece cell divider.

8. The filter underdrain system of claim 7, wherein the porous plates have lap-joints where the porous plates join into the one-piece cell divider.

9. The filter underdrain system of claim 6, wherein the porous plate is comprised of polyethylene.

10. The filter underdrain system of claim 6, wherein the multiple-piece dividers further comprise a saddle portion, the saddle portion being disposed on top of the porous plate and receives the dividing portion into a saddle in the saddle portion.

\* \* \* \* \*